United States Patent
Gali et al.

(10) Patent No.: US 12,377,783 B2
(45) Date of Patent: Aug. 5, 2025

(54) VEHICULAR TRAILERING ASSIST SYSTEM WITH AUTOMATIC TRAILER RECOGNITION

(71) Applicant: Magna Electronics Inc., Auburn Hills, MI (US)

(72) Inventors: Jyothi P. Gali, Rochester Hills, MI (US); Harold E. Joseph, Brampton (CA); Prasanna Ananthakrishnan, Tamilnadu (IN)

(73) Assignee: Magna Electronics Inc., Auburn Hills, MI (US)

( * ) Notice: Subject to any disclaimer, the term of this patent is extended or adjusted under 35 U.S.C. 154(b) by 134 days.

(21) Appl. No.: 18/507,518

(22) Filed: Nov. 13, 2023

(65) Prior Publication Data

US 2024/0157875 A1 May 16, 2024

Related U.S. Application Data

(60) Provisional application No. 63/383,550, filed on Nov. 14, 2022.

(51) Int. Cl.
| | |
|---|---|
| *B60R 1/00* | (2022.01) |
| *B60R 1/26* | (2022.01) |
| *G06T 7/12* | (2017.01) |
| *G06T 7/20* | (2017.01) |
| *G06V 10/74* | (2022.01) |

(Continued)

(52) U.S. Cl.
CPC ............... *B60R 1/003* (2013.01); *B60R 1/26* (2022.01); *G06T 7/12* (2017.01); *G06T 7/20* (2013.01); *G06V 10/74* (2022.01); *G06V 20/56* (2022.01); *H04N 7/183* (2013.01); *H04N 25/76* (2023.01); *B60R 2300/10* (2013.01); *B60R 2300/607* (2013.01); *G06T 2207/30252* (2013.01)

(58) Field of Classification Search
CPC ....... B60R 1/003; B60R 1/26; B60R 2300/10; B60R 2300/607; B60R 1/00; G06T 7/12; G06T 7/20; G06T 2207/30252; G06T 7/74; G06T 2207/10016; G06V 10/74; G06V 20/56; G06V 10/44; G06V 10/751; H04N 7/183; H04N 25/76; H04N 25/705
See application file for complete search history.

(56) References Cited

U.S. PATENT DOCUMENTS

| | | |
|---|---|---|
| 6,690,268 B2 | 2/2004 | Schofield et al. |
| 7,038,577 B2 | 5/2006 | Pawlicki et al. |

(Continued)

*Primary Examiner* — James M Pontius
(74) *Attorney, Agent, or Firm* — HONIGMAN LLP (57) ABSTRACT

A vehicular trailering assist system includes a camera disposed at a vehicle and viewing at least rearward of the vehicle. The vehicular trailering assist system transforms captured image data into a bird's-eye view of the hitch of the trailer, and accesses a plurality of stored trailer templates, with each respective trailer template being generated during a previous calibration of the system for a respective trailer. The vehicular trailering assist system generates a matching score based on a comparison between a stored trailer template and the transformed bird's-eye view. The vehicular trailering assist system, responsive to determining that the matching score for one of the plurality of stored trailer templates exceeds a threshold matching score, tracks a trailer angle of the trailer using the one plurality of stored trailer templates.

20 Claims, 13 Drawing Sheets

(51) Int. Cl.
  *G06V 20/56* (2022.01)
  *H04N 7/18* (2006.01)
  *H04N 25/76* (2023.01)

(56) References Cited

U.S. PATENT DOCUMENTS

| | | | |
|---|---|---|---|
| 7,720,580 | B2 | 5/2010 | Higgins-Luthman |
| 7,855,755 | B2 | 12/2010 | Weller et al. |
| 9,085,261 | B2 | 7/2015 | Lu et al. |
| 9,290,203 | B2* | 3/2016 | Lavoie ................ B62D 15/027 |
| 9,446,713 | B2 | 9/2016 | Lu et al. |
| 9,558,409 | B2 | 1/2017 | Pliefke et al. |
| 9,610,975 | B1* | 4/2017 | Hu ........................... B60D 1/06 |
| 10,086,870 | B2 | 10/2018 | Gieseke et al. |
| 10,160,382 | B2 | 12/2018 | Pliefke et al. |
| 10,532,698 | B2 | 1/2020 | Potnis et al. |
| 10,552,976 | B2 | 2/2020 | Diessner et al. |
| 10,586,119 | B2 | 3/2020 | Pliefke et al. |
| 10,638,025 | B2 | 4/2020 | Gali et al. |
| 10,706,291 | B2 | 7/2020 | Diessner et al. |
| 10,733,757 | B2 | 8/2020 | Gupta et al. |
| 10,755,110 | B2 | 8/2020 | Bajpai |
| 11,358,637 | B2* | 6/2022 | Kroeze ................ G05D 1/0212 |
| 11,662,196 | B2* | 5/2023 | Joseph ................ G01B 11/043 |
| | | | 382/104 |
| 12,258,065 | B2 | 3/2025 | Lu et al. |
| 2005/0074143 | A1* | 4/2005 | Kawai ..................... B60D 1/62 |
| | | | 382/104 |
| 2015/0002670 | A1 | 1/2015 | Bajpai |
| 2017/0174022 | A1* | 6/2017 | Hu ........................... H04N 7/18 |
| 2017/0174023 | A1* | 6/2017 | Hu ......................... B62D 13/06 |
| 2017/0174128 | A1* | 6/2017 | Hu ............................. G06T 7/60 |
| 2017/0174130 | A1* | 6/2017 | Hu ......................... B62D 13/06 |
| 2017/0177949 | A1* | 6/2017 | Hu ........................ B60W 10/20 |
| 2017/0177973 | A1* | 6/2017 | Hu ............................. G06T 7/13 |
| 2017/0178328 | A1* | 6/2017 | Hu ......................... H04N 7/183 |
| 2017/0217372 | A1 | 8/2017 | Lu et al. |
| 2017/0254873 | A1 | 9/2017 | Koravadi |
| 2018/0215382 | A1 | 8/2018 | Gupta et al. |
| 2018/0276838 | A1 | 9/2018 | Gupta et al. |
| 2019/0064831 | A1 | 2/2019 | Gali et al. |
| 2019/0118860 | A1 | 4/2019 | Gali et al. |
| 2019/0347825 | A1 | 11/2019 | Gupta et al. |
| 2020/0017143 | A1 | 1/2020 | Gali |
| 2020/0331527 | A1* | 10/2020 | Kim ..................... B62D 15/021 |
| 2020/0334475 | A1 | 10/2020 | Joseph et al. |
| 2020/0356788 | A1* | 11/2020 | Joseph ..................... G01B 11/26 |
| 2020/0361397 | A1 | 11/2020 | Joseph et al. |
| 2020/0406967 | A1 | 12/2020 | Yunus et al. |
| 2021/0061353 | A1* | 3/2021 | Miller .................. G01B 11/275 |
| 2021/0078634 | A1 | 3/2021 | Jalalmaab et al. |
| 2021/0129906 | A1* | 5/2021 | Oh ........................ B62D 15/025 |
| 2021/0170820 | A1* | 6/2021 | Zhang ..................... B60D 1/36 |
| 2021/0170947 | A1 | 6/2021 | Yunus et al. |
| 2021/0179172 | A1* | 6/2021 | Kroeze ................ G05D 1/0246 |
| 2022/0024391 | A1* | 1/2022 | Gali ........................... G06T 7/73 |
| 2022/0027644 | A1 | 1/2022 | Gali et al. |
| 2022/0028111 | A1* | 1/2022 | Gali ........................ G06V 20/56 |
| 2022/0063720 | A1* | 3/2022 | Oh ......................... B60D 1/245 |
| 2022/0212599 | A1* | 7/2022 | Gali ........................... B60R 1/26 |
| 2023/0410359 | A1* | 12/2023 | Mustafa ..................... G06T 7/74 |
| 2024/0157876 | A1* | 5/2024 | Gali ........................ B60R 1/003 |
| 2024/0336256 | A1* | 10/2024 | Nariyambut Murali ..................... B60D 1/62 |

\* cited by examiner

VEHICULAR TRAILERING ASSIST SYSTEM WITH AUTOMATIC TRAILER RECOGNITION

CROSS REFERENCE TO RELATED APPLICATION

The present application claims the filing benefits of U.S. provisional application Ser. No. 63/383,550, filed Nov. 14, 2022, which is hereby incorporated herein by reference in its entirety.

FIELD OF THE INVENTION

The present invention relates generally to a vehicular trailering assist system for a vehicle towing a trailer and, more particularly, to a vehicular trailering assist system that utilizes one or more cameras at a vehicle for determining trailer angle of the trailer relative to the vehicle.

BACKGROUND OF THE INVENTION

Use of imaging sensors in vehicular trailering assist systems is common and known. Examples of such known systems are described in U.S. Pat. Nos. 9,446,713 and 9,085,261, which are hereby incorporated herein by reference in their entireties.

SUMMARY OF THE INVENTION

A vehicular trailering assist system includes a camera disposed at a vehicle equipped with the vehicular trailering assist system. The camera views at least rearward of the vehicle and is operable to capture frames of image data. The camera includes a CMOS imaging array with at least one million photosensors arranged in rows and columns. An electronic control unit (ECU) includes electronic circuitry and associated software. Image data captured by the camera is transferred to and are processed at the ECU. The vehicular trailering assist system, with a trailer hitched to the vehicle and with the camera viewing at least a hitch of the trailer that hitches the trailer to the vehicle, and via processing at the ECU of image data captured by the camera and transferred to the ECU, transforms image data captured by the camera into a transformed bird's-eye view of the hitch of the trailer. The vehicular trailering assist system accesses a plurality of stored trailer templates. Each respective stored trailer template of the plurality of stored trailer templates was generated during a previous calibration of the system for a respective trailer associated with the respective stored trailer template. The vehicular trailering assist system, for at least one stored trailer template of the plurality of stored trailer templates, generates a matching score based on a comparison between the at least one stored trailer template and the transformed bird's-eye view of the hitch of the trailer. The vehicular trailering assist system determines that the matching score for one of the at least one stored trailer template is greater than a threshold matching score. The vehicular trailering assist system, responsive to determining that the matching score for the one of the at least one stored trailer template is greater than the threshold matching score, tracks a trailer angle of the trailer using the one of the at least one stored trailer template.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or trailering assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The system includes an image processor or image processing system that is operable to receive image data from one or more cameras and may provide an output to a display device for displaying images representative of the captured image data. Optionally, the system may provide a rearview display or a top down or bird's eye or surround view display or the like.

Figure 1:
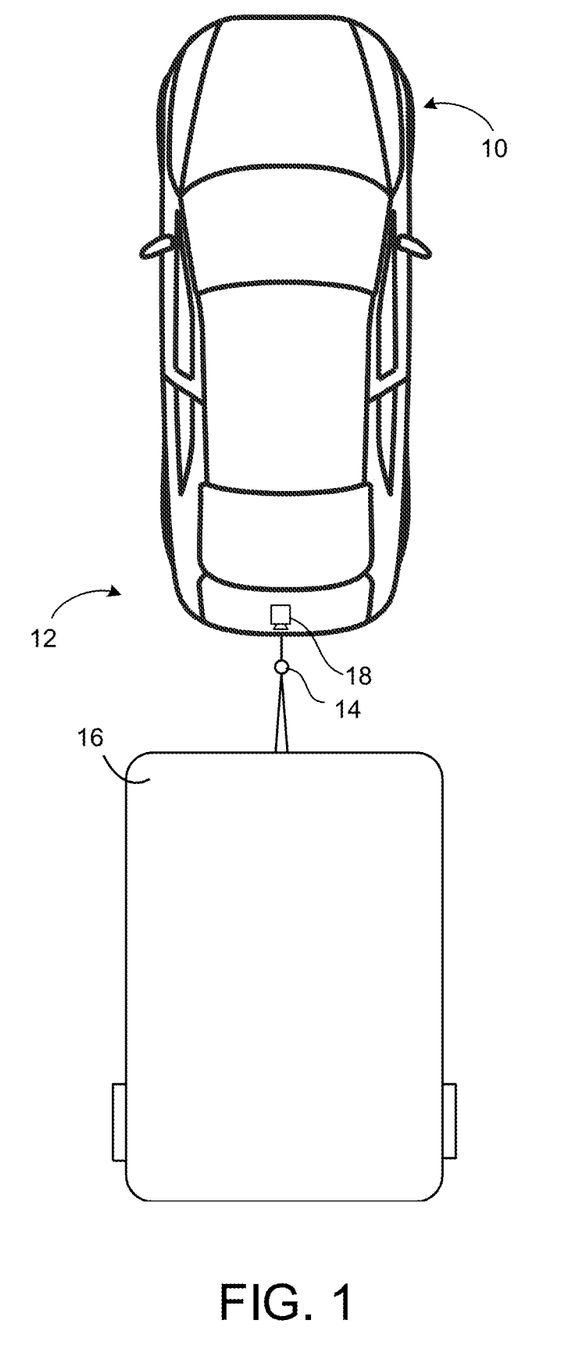
FIG. 1 is a plan view of a vehicle with a trailering assist system that is operable to determine a trailer angle of a trailer relative to a towing vehicle in accordance with the present invention.

Referring now to the drawings and the illustrative embodiments depicted therein, a vehicle 10 includes a trailering assist system 12 that is operable to assist in backing up or reversing with a hitched trailer via, for example, a hitch 14 and may maneuver the vehicle 10 and trailer 16 toward a desired or selected location. The trailering assist system 12 includes at least one exterior viewing vehicle-based imaging sensor or camera, such as a rearward viewing imaging sensor or camera 18, such as a rear backup camera of the vehicle (and the system may optionally include multiple exterior viewing imaging sensors or cameras, such as a sideward/rearward viewing camera at respective sides of the vehicle), which captures image data representative of the scene exterior and at least rearward of the vehicle 10, which includes the hitch 14 and/or trailer 16, with the camera 18 having a lens for focusing images at or onto an imaging array or imaging plane or imager of the camera (FIG. 1). Optionally, the camera is a center-high-mounted stop lamp (CHMSL) camera. Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control or electronic control unit (ECU) or processor that is operable to process image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Trailer assist features are commonly included on many modern vehicles. These systems assist the driver in, for example, maneuvering with the trailer and/or warning of jackknife scenarios. In order to use trailer assist features, the system generally must first be calibrated for the particular attached trailer using either inline calibration or explicit calibration. Calibration allows the system to accurately determine the current trailer angle (i.e., the angle of the trailer relative to the vehicle) for the calibrated trailer in real-time. Conventionally, once the calibration is complete, the user must manually select the trailer (e.g., from a list of previously calibrated trailers) when the trailer is hitched to the vehicle. For example, a user hitches the trailer to the vehicle, and then, assuming the trailer has previously been calibrated by the system, the user selects the trailer from a list. The system may then recall the calibration for the selected trailer.

Implementations herein include a trailering assist system that includes vision-based automatic recognition of a previously calibrated trailer (i.e., a trailer the system was previously calibrated for) in order to remove any manual selection of trailer by the user. This allows the trailering assist system to automatically recognize and select a previously calibrated trailer. For example, when a user hitches a previously calibrated trailer to the vehicle, the system will automatically determine that the trailer has been previously calibrated and recall the calibration for the selected trailer without user input. However, recognition of trailers poses many serious challenges, such as day/night scenarios, weather conditions (e.g., precipitation, fog, etc.), background noise, etc. The trailering assist system uses a trailer template which is generated during the calibration drive. The system may use this trailer template for future automatic recognition (i.e., without human intervention) of the calibrated trailer. The system may work with target-less trailers. That is, the trailer does not require a specific target (e.g., a sticker or other decal) to be added to the trailer for recognition.

Figure 2:
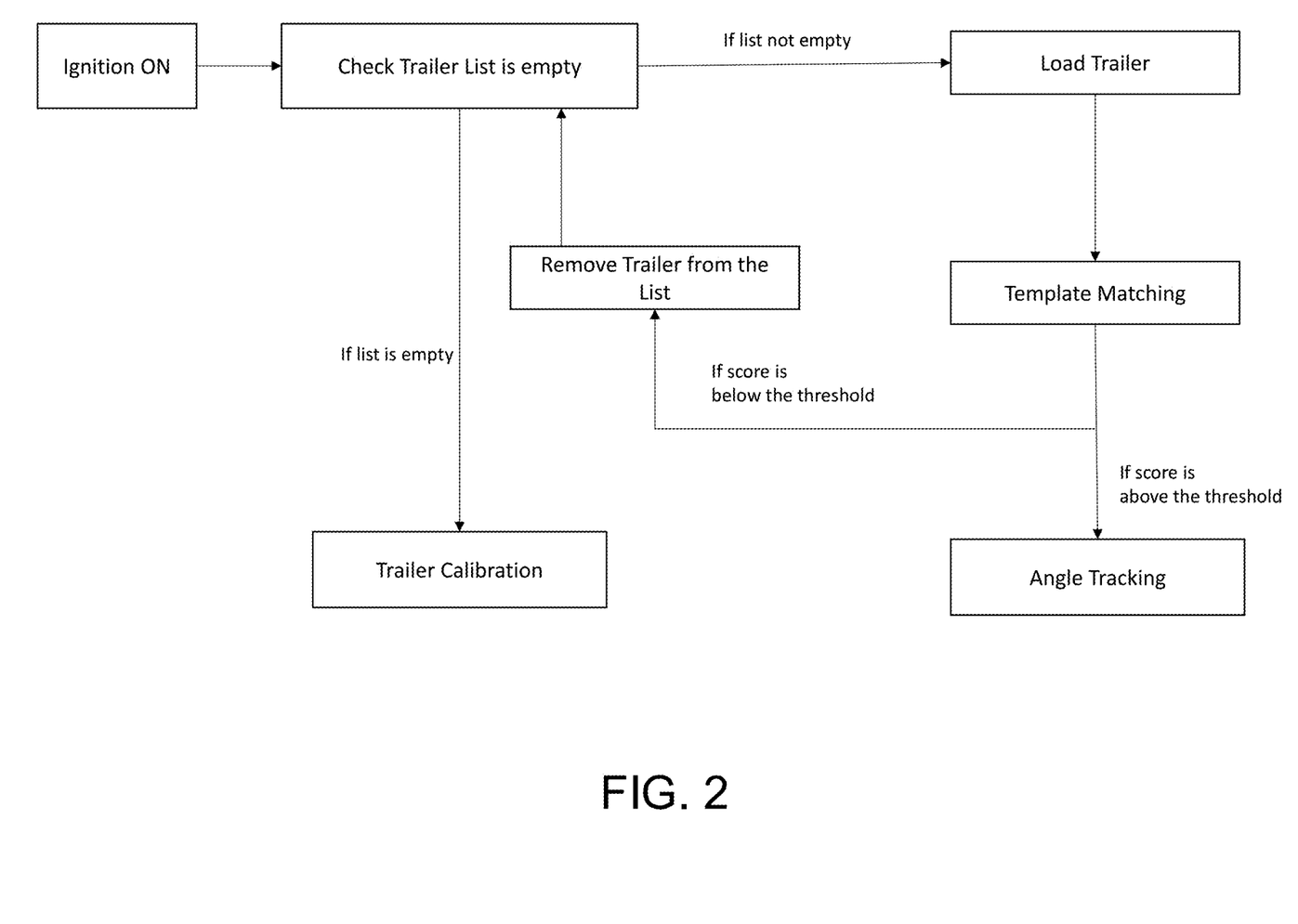
FIG. 2 is a block diagram of the trailering assist system of FIG. 1.
Figure 3:
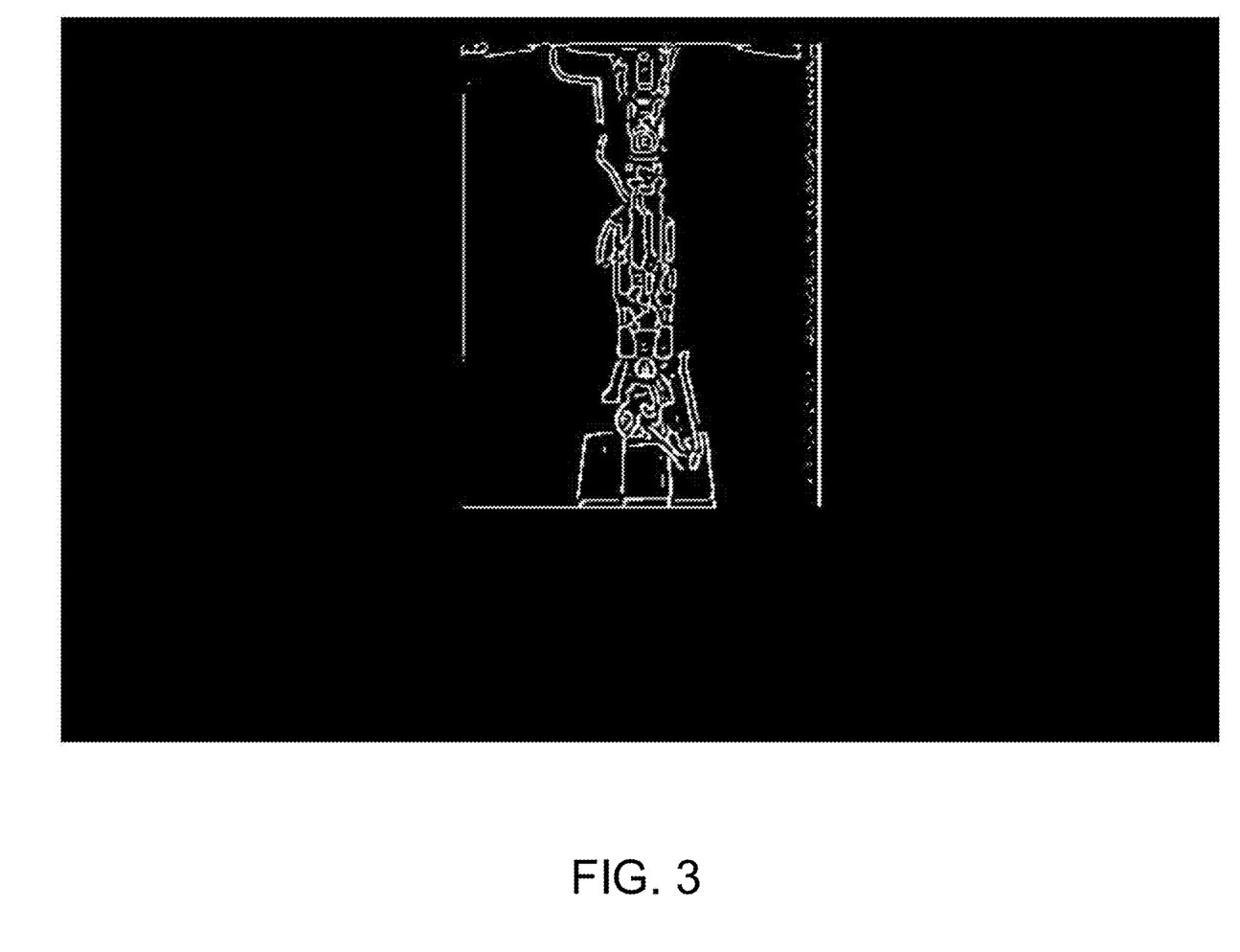
FIGS. 3 and 4 are example trailer templates.
Figure 4:
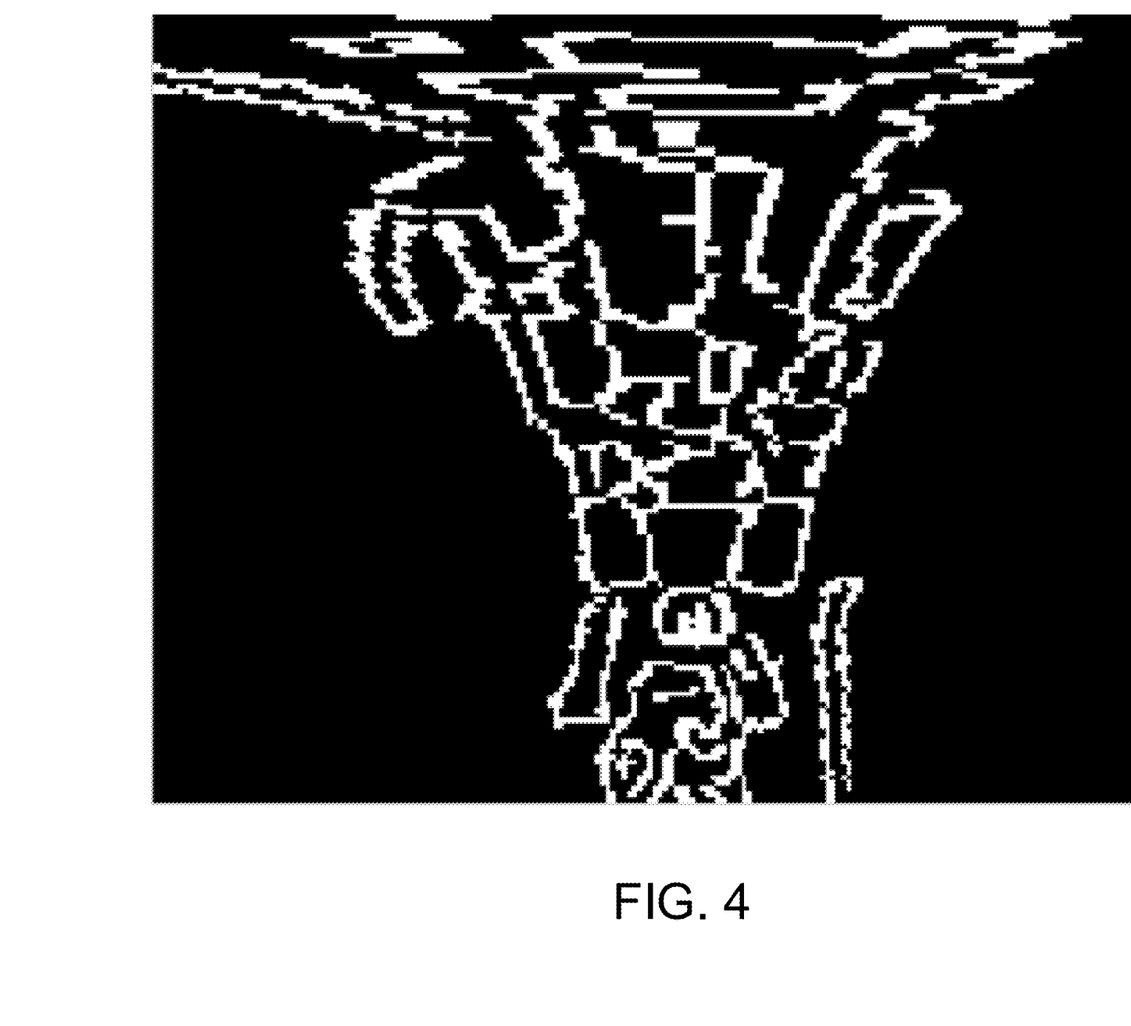

Referring now to FIG. 2, during initial calibration of the system for the trailer (e.g., when the trailer is hitched to the vehicle for the first time), the system generates a trailer template (FIGS. 3 and 4) for angle tracking (i.e., for tracking the angle of the trailer relative to the vehicle). For example, the system may utilize aspects for the trailer template generation described in U.S. provisional application Ser. No. 63/383,554, filed Nov. 14, 2022, which is hereby incorporated herein by reference in its entirety. The trailer template (generated using, for example, edge detection algorithms and the like) provides a type of identification of the hitch/coupler of the trailer based on image data captured by a camera of the vehicle. The system may also use the trailer template to automatically determine whether a hitched/connected trailer has been previously calibrated or not. When the system determines that a trailer is hitched to the vehicle, the system uses template matching to generate a score for each trailer template previously stored by the system (e.g., each template in a list) compared to a current trailer template of the hitched trailer. That is, the system compares the stored templates of previously calibrated trailers against a template of the currently hitched trailer. Whichever trailer template that has the highest score and that also exceeds a score threshold (i.e., a threshold sufficient to determine that the stored trailer template adequately matches the current trailer template) may be selected (i.e., determined to be a previously calibrated trailer) and sent to an angle tracking module for tracking the current trailer angle (i.e., the angle of the trailer relative to the vehicle).

Figure 5:
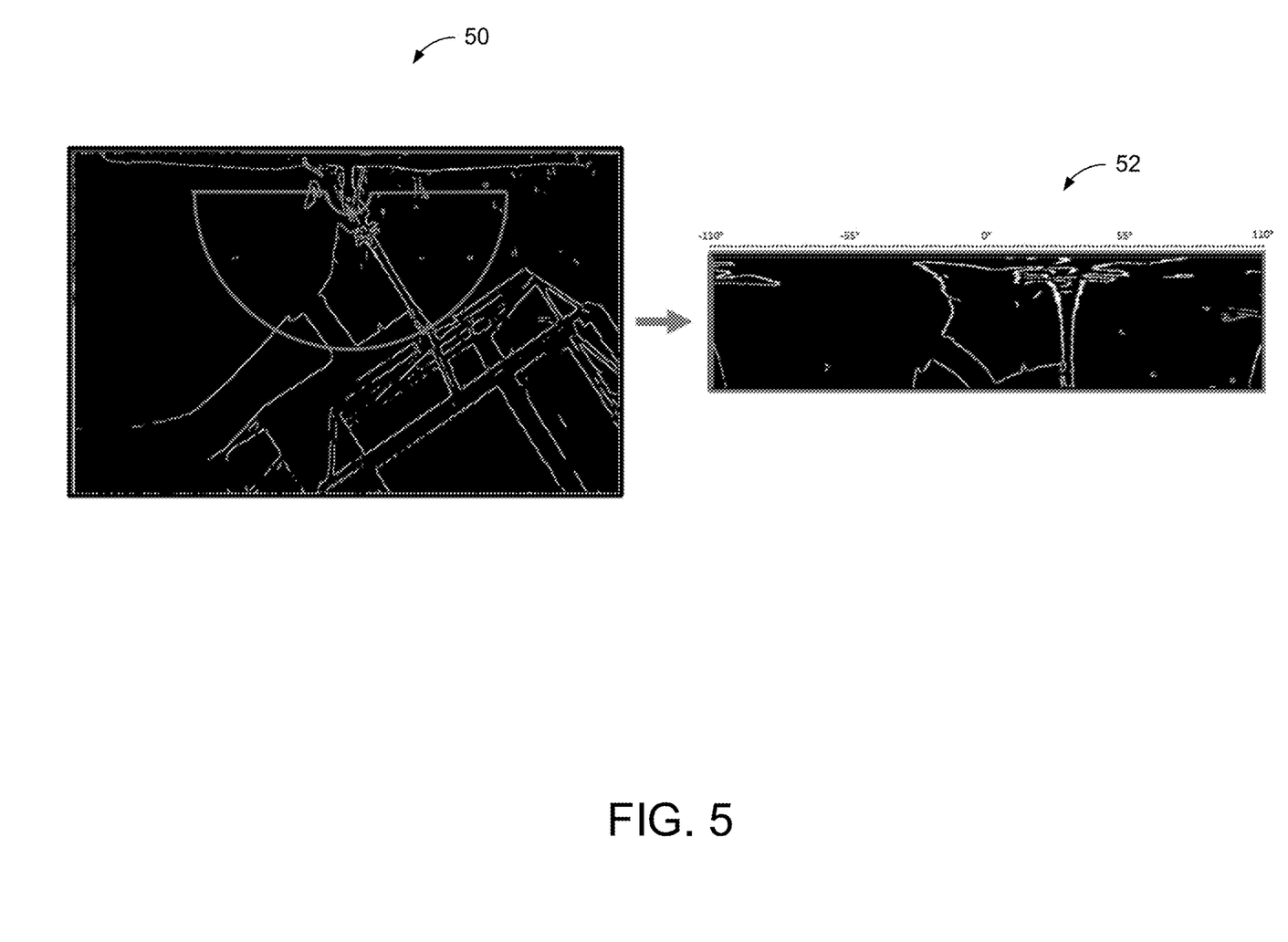
FIG. 5 is a banana view transformation of a top-view image captured by the trailering assist system of FIG. 1.

Referring now to FIG. 5, to determine the matching score with each stored trailer template, a banana view transformation may be applied on a top-view (i.e., a bird's-eye view) image of the trailer currently attached to the vehicle captured by a camera disposed at the rear of the vehicle. The top-view image may be provided as input to a trailer recognition algorithm. This transformation, also known as a bow transformation, removes the rotational motion of the trailer which helps to recognize the trailer at different angles. This is because the banana view transformation causes changes in the trailer angle to move the trailer laterally in the image frame instead of rotationally (FIG. 5). That is, using this transformation, the trailer hitch maintains the same orientation regardless of the trailer angle, and instead the trailer hitch moves laterally (i.e., to the left and to the right) in the image based on the trailer angle. For example, as the trailer angle increases, the trailer hitch moves laterally to the right in the transformation (instead of rotationally), and as the trailer angle decreases, the trailer hitch moves laterally to the left (instead of rotationally). In FIG. 5, the outlined portion of image 50 is transformed into the banana view 52.

Figure 6:
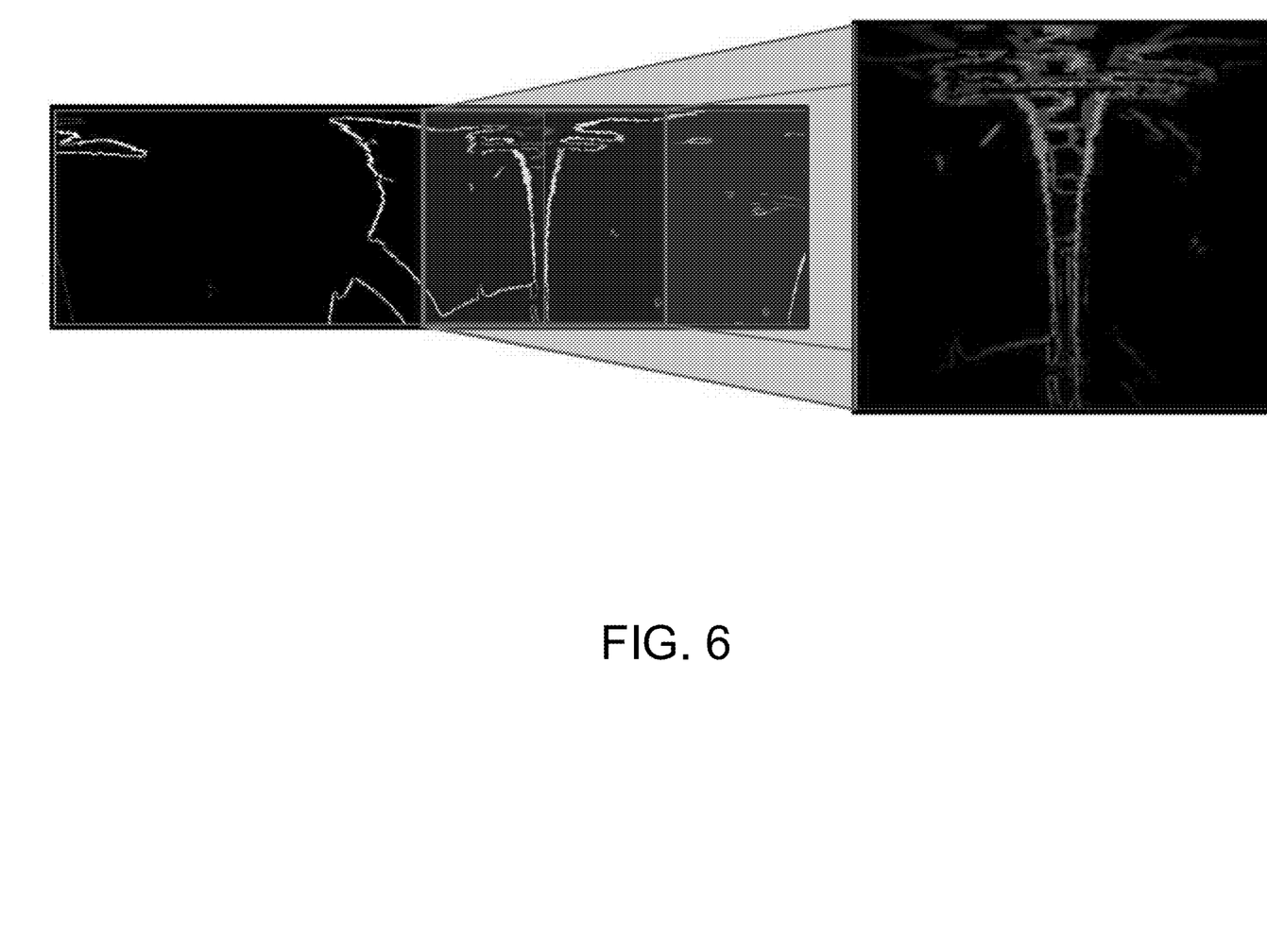
FIG. 6 is a view of template matching.

To determine the initial trailer angle, the banana view 52 or transformation may be divided into a number of columns, where each column is associated with a particular trailer angle. In the example of FIG. 5, the far-left column represents a trailer angle of negative 110 degrees while the far-right column represents a trailer angle of positive 110 degrees. Similarly, the column in the center of the image represents a 0 degree trailer angle. To determine the current trailer angle, the trailer template is moved along the banana view and a score is generated using template matching for each column. That is, the system determines a similarity or matching score for the template at each column. The column having the highest score among all of the columns is determined to be the position of the trailer in the banana warped view (FIG. 6). The current trailer angle may be determined based on the angle associated with the column with the highest score.

Figure 7:
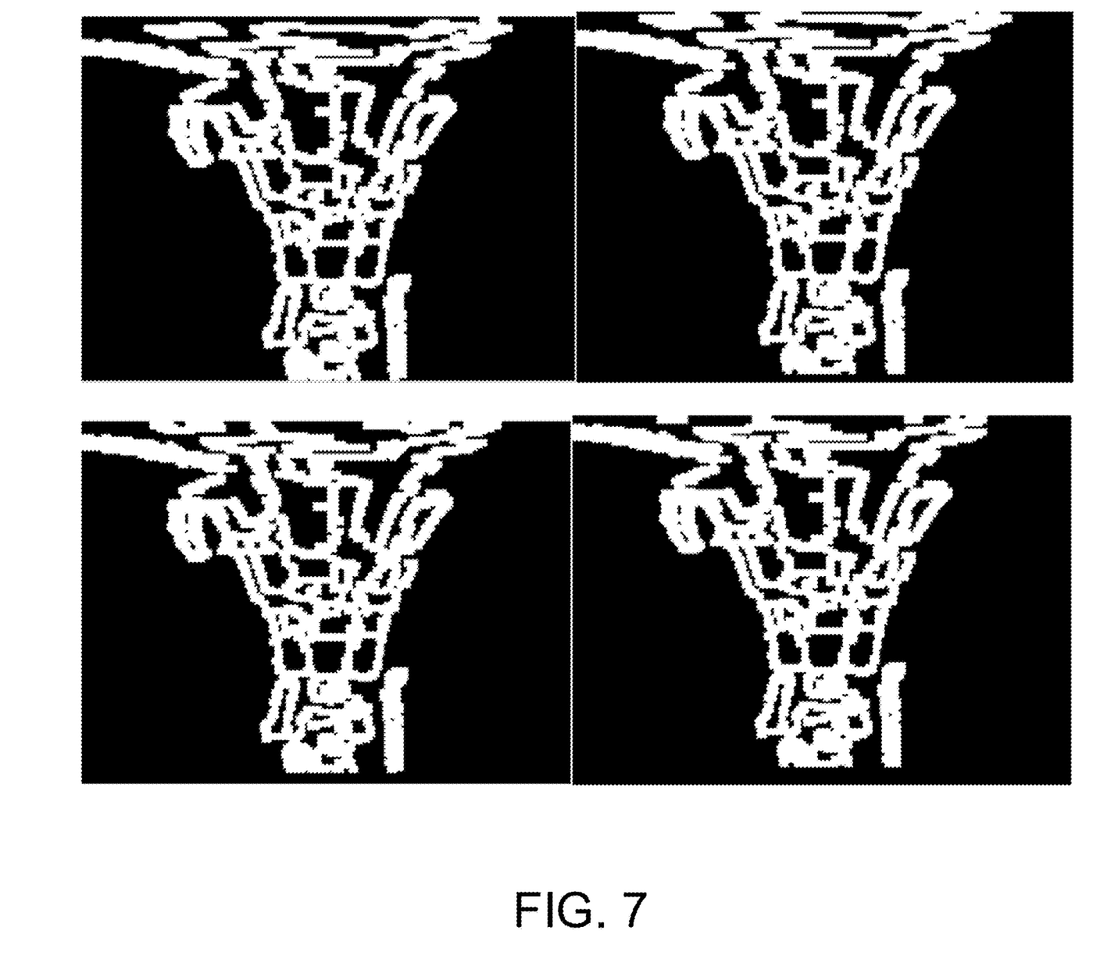
FIG. 7 is a view of a plurality of region of interest templates.
Figure 8:
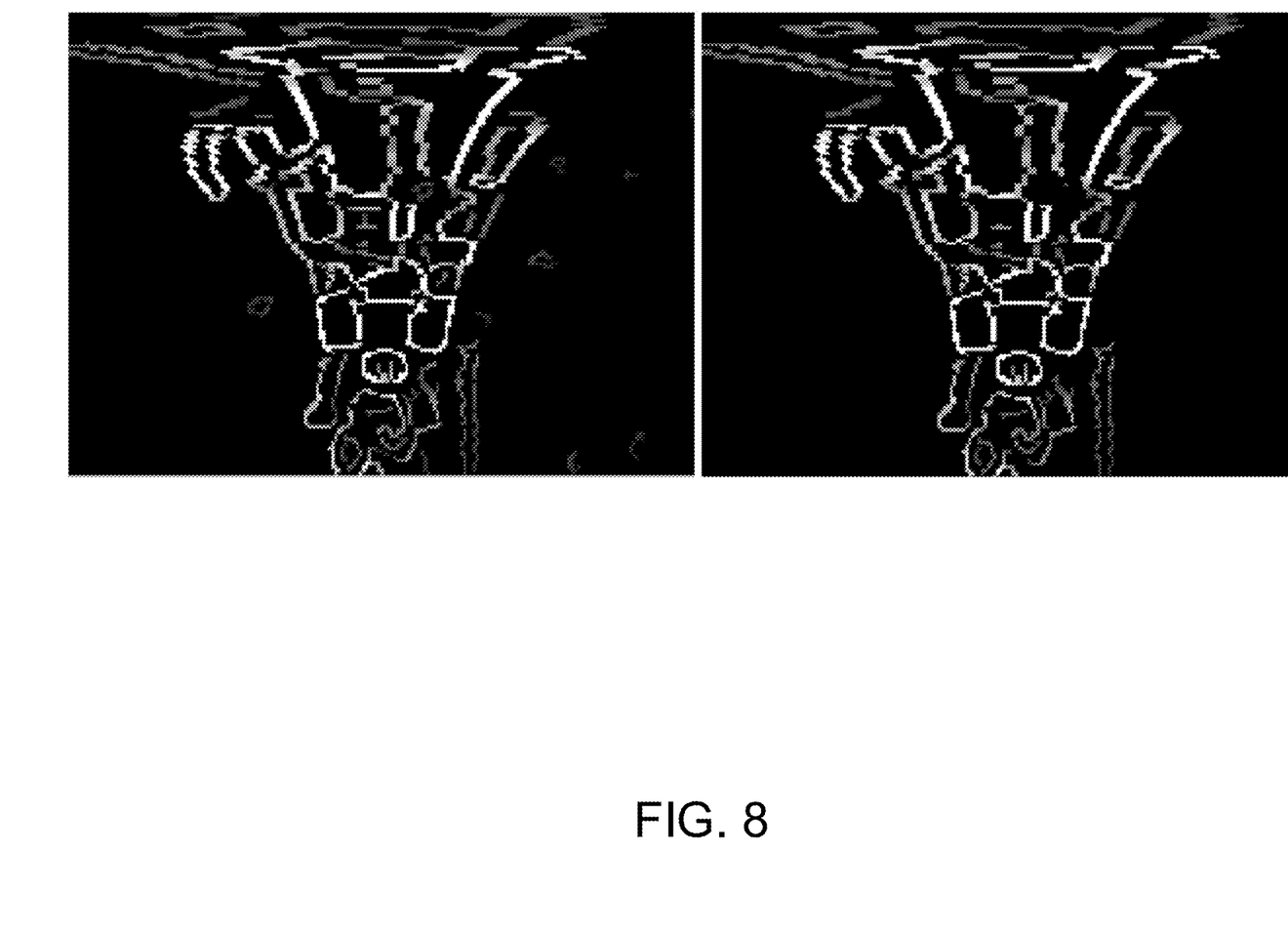
FIGS. 8-11 are views of edge removal from trailer templates.
Figure 9:
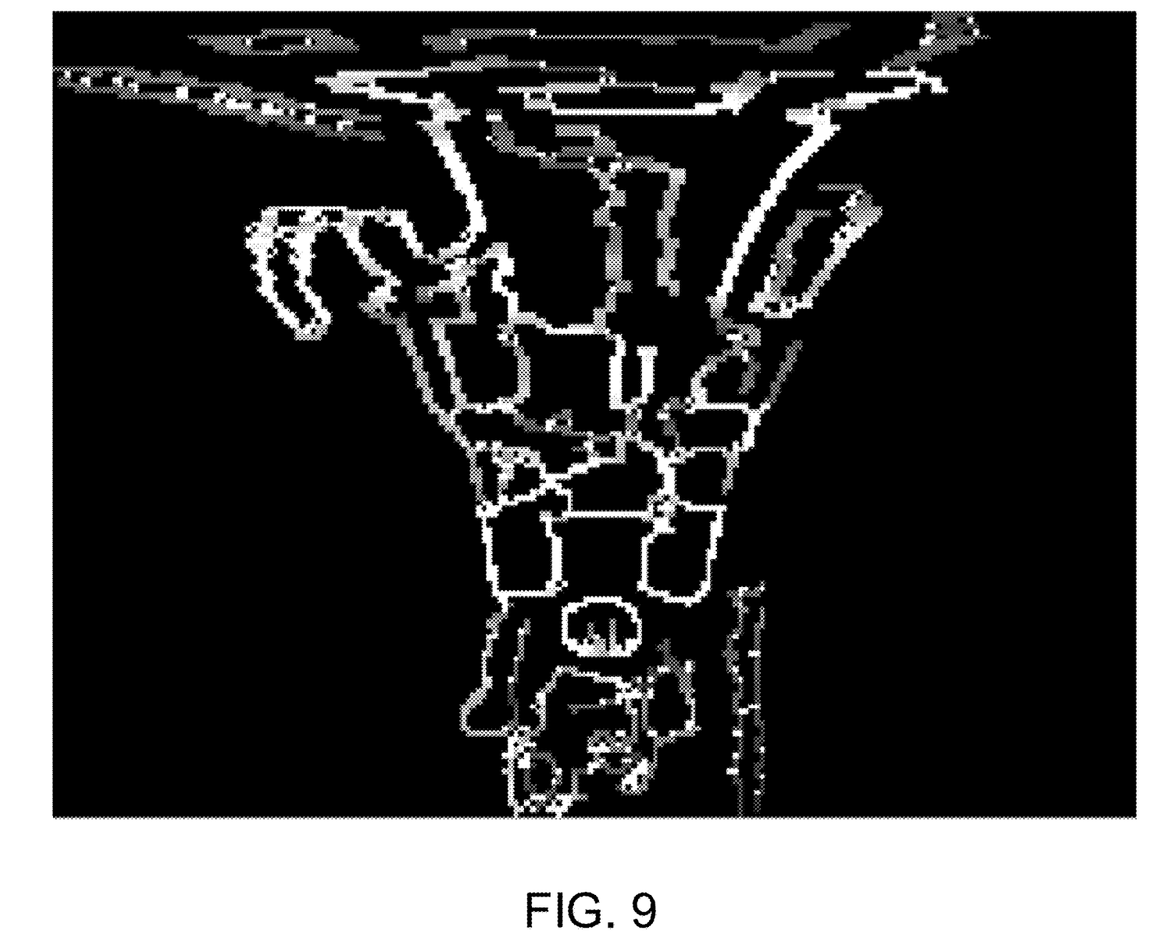
Figure 10:
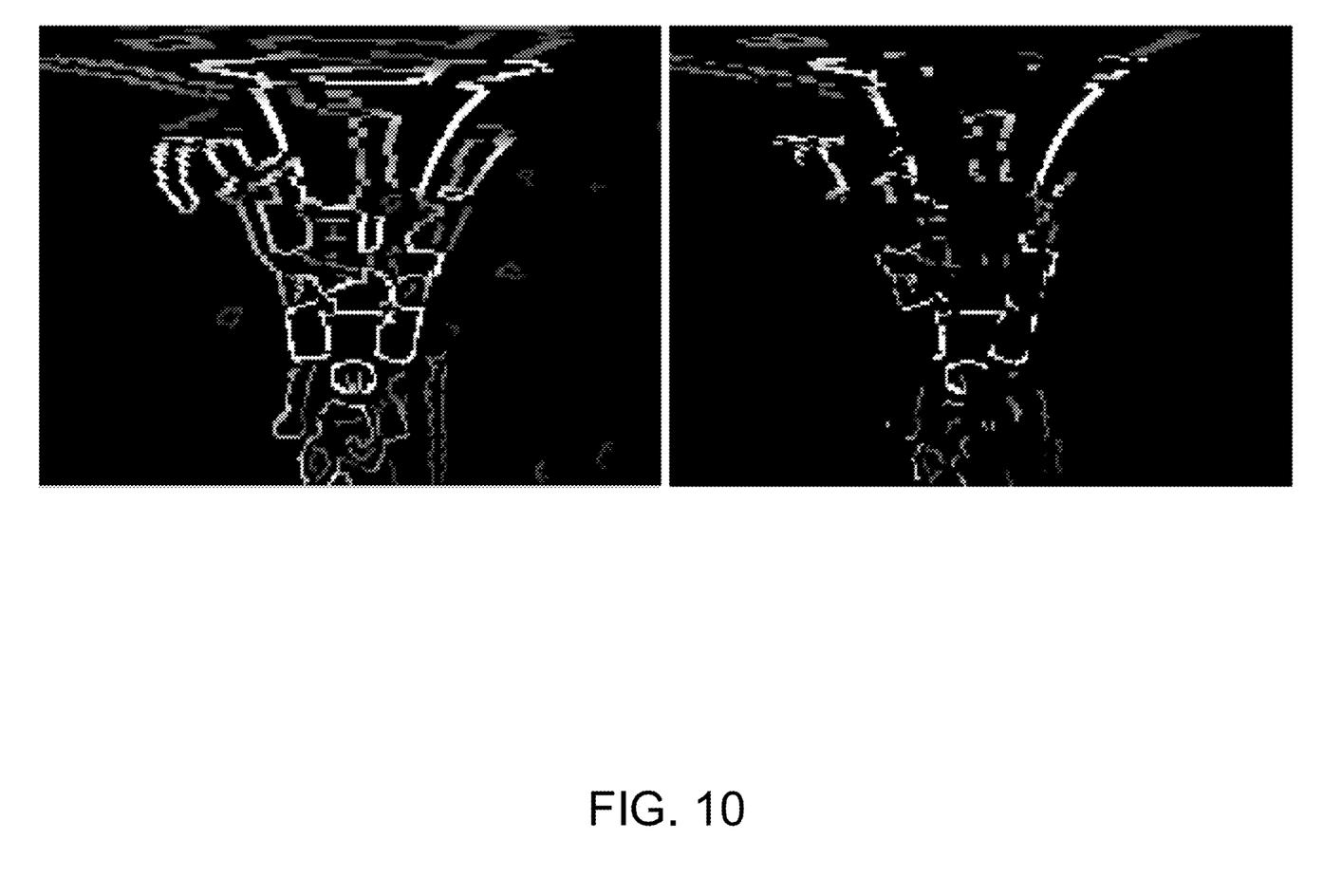
Figure 11:
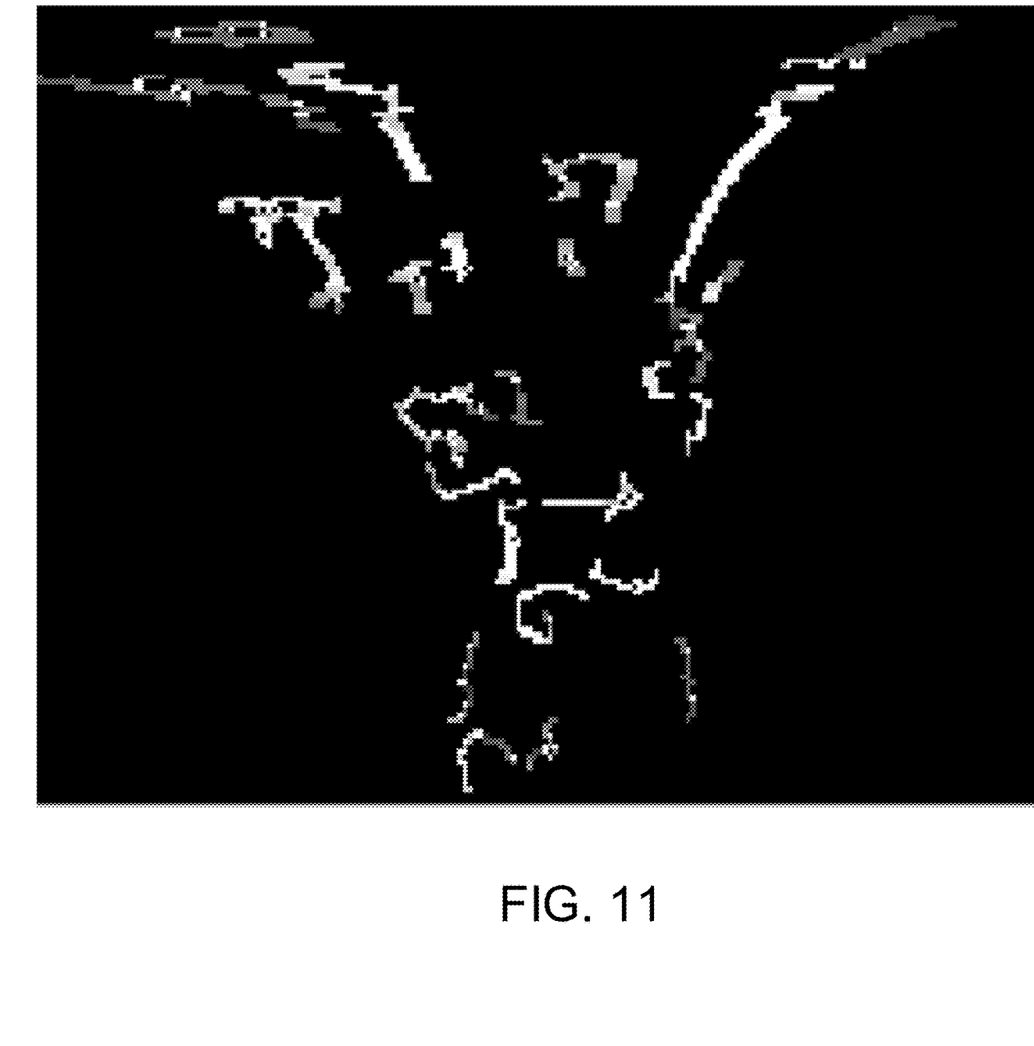

Next, the system generates region of interest (ROI) templates (FIG. 7). For example, a 3*3 dilation is applied on the trailer template which acts as the ROI for template matching. For some trailers which have loose hitches, the trailer position changes in the image when the vehicle is moving and stationary (as the hitch shifts, compresses, and or stretches). Multiple templates may be generated in order to solve the trailer hitch swinging issue (i.e., a separate template for different states of the hitch). Scores may then be generated for each template. As shown in FIGS. 8 and 9, the system may next perform edge removal. Once the initial trailer position is found, the system may slide the template a threshold amount (e.g., at least ten pixels, at least twenty pixels, etc.) in different directions (e.g., to the left, to the right, up, down, etc.). For each position, a score is generated. Once the system crops a position in a banana view, the system applies a dot product to the edge image with the trailer template. This removes unwanted edges. Optionally, a number of edge pixels in the non-binary ROI position is counted and sent to a score generation module. Once the dot product is applied, one or more edge removal processes may be executed (FIGS. 10 and 11). Each edge may be separated using, for example, a connected component algorithm to remove unwanted edges. The threshold for removing unwanted edges may be set dynamically based on the edges available in the image, so the threshold varies for different conditions and trailers dynamically.

Figure 12:
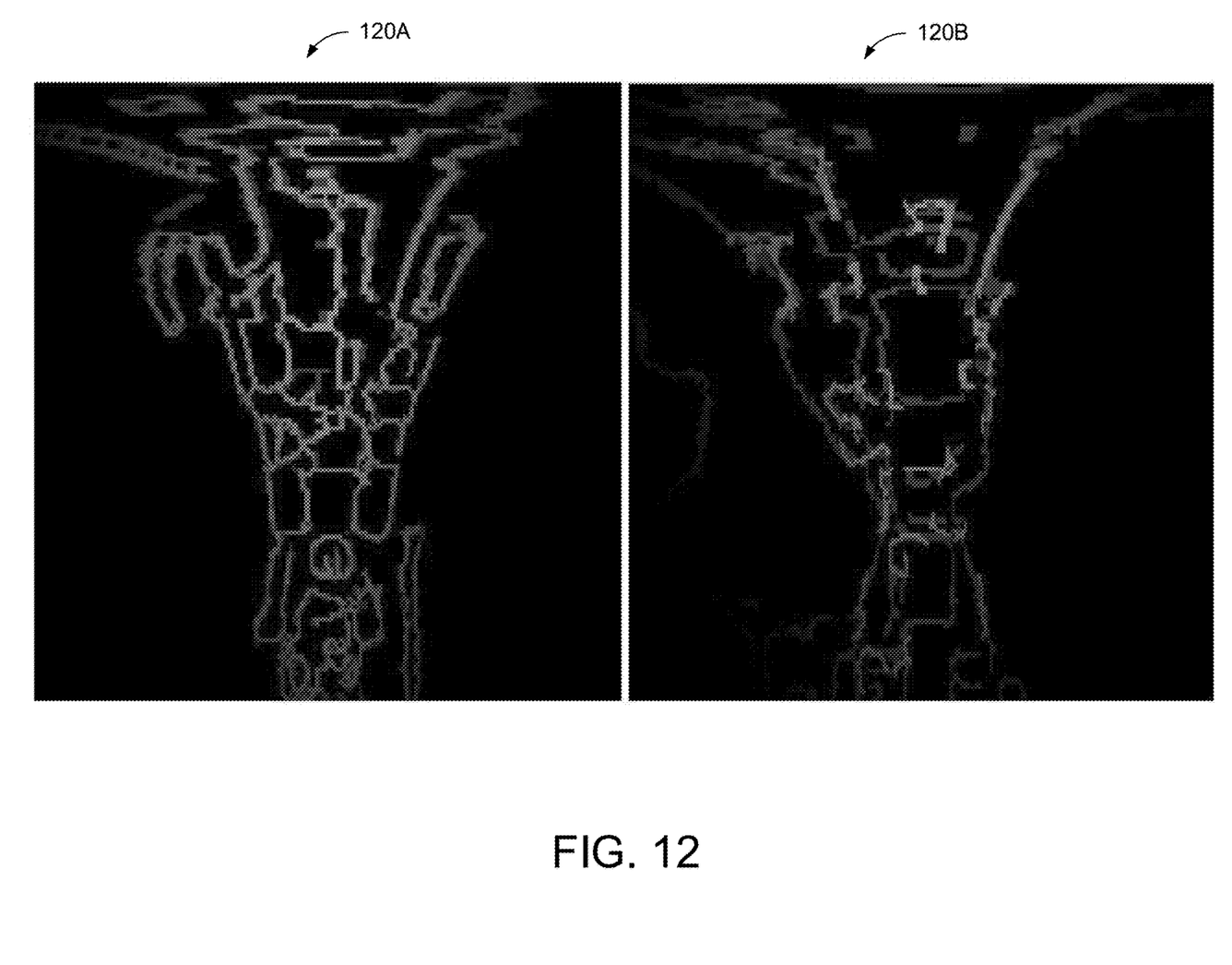
FIG. 12 is a view of template matching with a correct and an incorrect template.

Next, the system generates scores (FIG. 12). Once the edges are removed, scores are generated with the available edges along with the edges present in the non-binary areas. Scores are generated for each position based on a comparison of each generated template with the previously stored template. For example, the closer the templates match (i.e., the more similar the templates are to each other), the higher the score. Once all the scores are generated, the position with the highest score that is also greater than a threshold (i.e., a threshold matching score) is selected and that position is converted into a trailer angle and provided to the angle tracking module. If the highest score is not above the threshold, then the system determines that the currently hitched trailer does not match the trailer represented by the previously stored trailer template. Then the next previously stored trailer template is selected (e.g., from a list of previously calibrated trailers) and the process continues until the trailer list is empty (i.e., there are no remaining previously stored trailer templates to compare). If no score satisfies the threshold and the trailer list is empty, the system determines that the hitched trailer has yet to be calibrated. In this scenario, the system may prompt the user (e.g., via a display disposed within the vehicle) to perform the calibration maneuver with the vehicle to calibrate the hitched trailer. Image 120A in FIG. 12A represents template matching with the correct template (i.e., there is a match) while image 120B represents template matching with an incorrect template (i.e., there is not a match).

Figure 13:
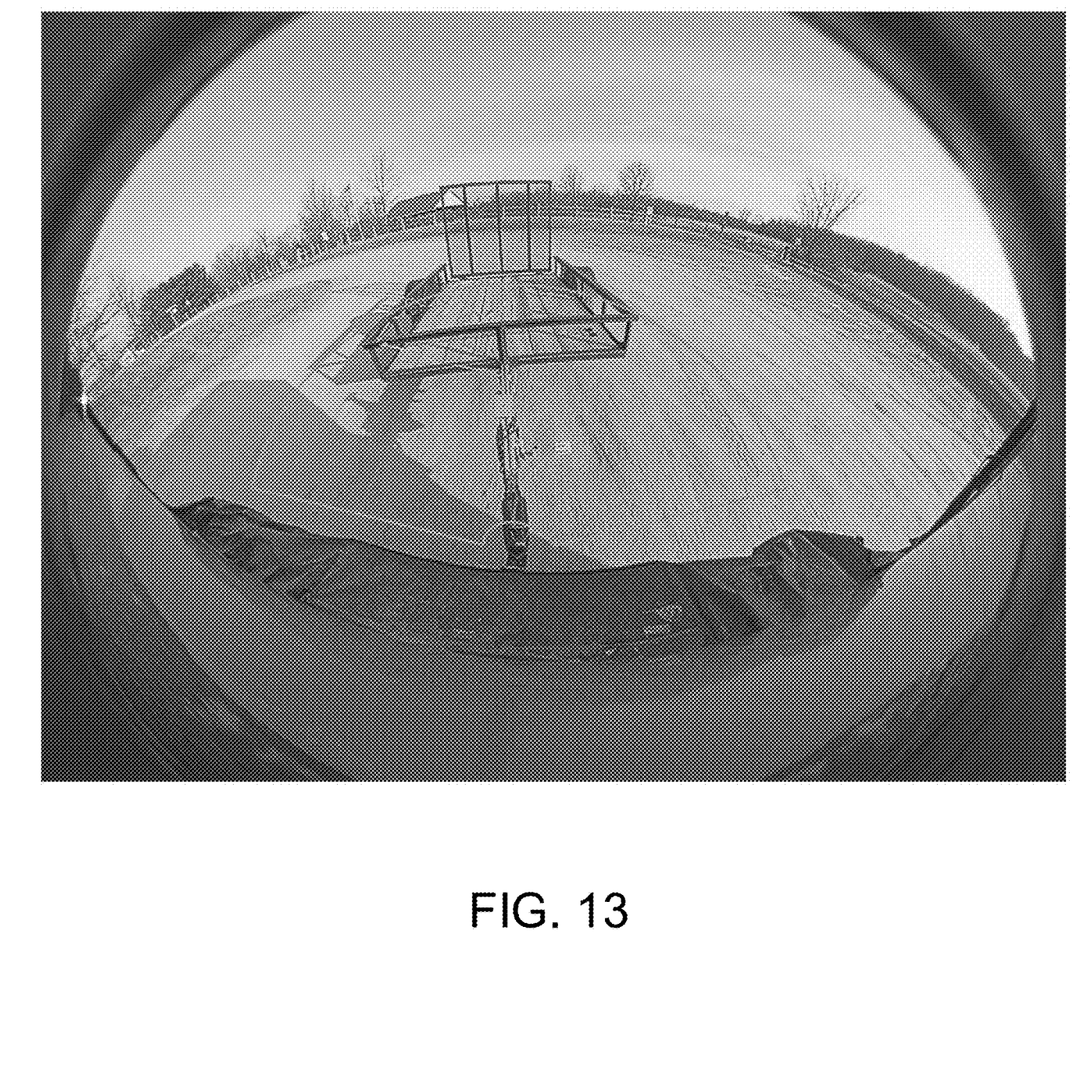
FIG. 13 is a frame of image data captured by a rearview camera with a banana view transformation region.

While the banana view may be applied to the top-view that only covers the coupler region, the system may also include at least a portion of the trailer in the processing area by applying a banana view in a different rear view image (FIG. 13) or increasing the size of the banana view in the top-view.

Thus, the trailering assist system uses template matching and banana view transformations to automatically determine whether the system has been previously calibrated for a hitched trailer without any user input (e.g., indicating that the system has been calibrated for that trailer, selecting the trailer from a list, adding a target to the trailer, etc.). The system generates a trailer template of the current trailer and compares the template to stored trailer templates of previously calibrated trailers. When the current trailer matches one of the stored trailer templates with a sufficiently high score, the system may determine the previously calibrated trailer associated with the stored trailer template is the same as the trailer currently hitched to the vehicle, and thus the currently hitched trailer has already been calibrated. Once the system determines that the system has previously been calibrated for the hitched trailer, the system may automatically begin to use the appropriate templates and any other associated calibration data to track the trailer angle of the hitched trailer to perform one or more trailing assist functions.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,552,976; 10,532,698; 10,160,382; 10,086,870; 9,558,409; 9,446,713; 9,085,261 and/or 6,690,268, and/or U.S. Publication Nos. US-2022-0028111; US-2022-0027644; US-2022-0024391; US-2021-0170947; US-2021-0170820; US-2021-0078634; US-2020-0406967; US-2020-0361397; US-2020-0356788; US-2020-0334475; US-2020-0017143; US-2019-0347825; US-2019-0118860; US-2019-0064831; US-2018-0276838; US-2018-0215382; US-2017-0254873; US-2017-0217372 and/or US-2015-0002670, and/or International Publication No. WO 2021/0127693, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224;

7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system, the vehicular trailering assist system comprising:
    a camera disposed at a vehicle equipped with the vehicular trailering assist system, the camera viewing at least rearward of the vehicle, wherein the camera is operable to capture frames of image data;
    wherein the camera comprises a CMOS imaging array, and wherein the CMOS imaging array comprises at least one million photosensors arranged in rows and columns;
    an electronic control unit (ECU) comprising electronic circuitry and associated software;
    wherein image data captured by the camera is transferred to and are processed at the ECU;
    wherein the vehicular trailering assist system, with a trailer hitched to the vehicle and with the camera viewing at least a hitch of the trailer that hitches the trailer to the vehicle, and via processing at the ECU of image data captured by the camera and transferred to the ECU, transforms image data captured by the camera into a transformed bird's-eye view of the hitch of the trailer;
    wherein the vehicular trailering assist system accesses a plurality of stored trailer templates, and wherein each respective stored trailer template of the plurality of stored trailer templates was generated during a previous calibration of the system for a respective trailer associated with the respective stored trailer template;
    wherein the vehicular trailering assist system, for at least one stored trailer template of the plurality of stored trailer templates, generates a matching score based on a comparison between the at least one stored trailer template and the transformed bird's-eye view of the hitch of the trailer;
    wherein the vehicular trailering assist system determines that the matching score for one of the at least one stored trailer template is greater than a threshold matching score; and
    wherein the vehicular trailering assist system, responsive to determining that the matching score for the one of the at least one stored trailer template is greater than the threshold matching score, tracks a trailer angle of the trailer using the one of the at least one stored trailer template.

2. The vehicular trailering assist system of claim 1, wherein the transformed bird's-eye view of the hitch of the trailer comprises a bow transformation removing rotational motion of the hitch in the image data.

3. The vehicular trailering assist system of claim 1, wherein the vehicular trailering assist system generates respective matching scores based on comparison between respective stored trailer templates of the plurality of stored trailer templates and the transformed bird's-eye view of the hitch of the trailer, and wherein the matching score for the one of the at least one stored trailer template is the highest matching score.

4. The vehicular trailering assist system of claim 1, wherein the vehicular trailering assist system determines the matching score based on determining a respective column score for each of a plurality of columns of the transformed bird's-eye view of the hitch of the trailer.

5. The vehicular trailering assist system of claim 4, wherein each column is associated with a respective trailer angle of the trailer relative to the vehicle.

6. The vehicular trailering assist system of claim 4, wherein the matching score is based on the highest column score of each respective column score.

7. The vehicular trailering assist system of claim 1, wherein the vehicular trailering assist system generates the matching score by applying a dilation to the respective stored trailer template and removing edges from the transformed bird's-eye view of the hitch of the trailer.

8. The vehicular trailering assist system of claim 7, wherein the vehicular trailering assist system removes edges from the transformed bird's-eye view of the hitch of the trailer based on a dot product between the respective stored trailer template and the transformed bird's-eye view of the hitch of the trailer.

9. The vehicular trailering assist system of claim 7, wherein the vehicular trailering assist system removes edges using a connected component algorithm.

10. The vehicular trailering assist system of claim 7, wherein a number of edges removed is based on a total number of edges in the transformed bird's-eye view of the hitch of the trailer.

11. The vehicular trailering assist system of claim 1, wherein the transformed bird's-eye view of the hitch of the trailer is representative of at least a portion of the trailer.

12. A vehicular trailering assist system, the vehicular trailering assist system comprising:
    a camera disposed at a vehicle equipped with the vehicular trailering assist system, the camera viewing at least rearward of the vehicle, wherein the camera is operable to capture frames of image data;

wherein the camera comprises a CMOS imaging array, and wherein the CMOS imaging array comprises at least one million photosensors arranged in rows and columns;

an electronic control unit (ECU) comprising electronic circuitry and associated software;

wherein image data captured by the camera is transferred to and are processed at the ECU;

wherein the vehicular trailering assist system, with a trailer hitched to the vehicle and with the camera viewing at least a hitch of the trailer that hitches the trailer to the vehicle, and via processing at the ECU of image data captured by the camera and transferred to the ECU, transforms image data captured by the camera into a transformed bird's-eye view of the hitch of the trailer, and wherein the transformed bird's-eye view of the hitch of the trailer comprises a bow transformation removing rotational motion of the hitch in the image data;

wherein the vehicular trailering assist system accesses a plurality of stored trailer templates, and wherein each respective stored trailer template of the plurality of stored trailer templates was generated during a previous calibration of the system for a respective trailer associated with the respective stored trailer template;

wherein the vehicular trailering assist system, for at least one stored trailer template of the plurality of stored trailer templates, generates a matching score based on a comparison between the at least one stored trailer template and the transformed bird's-eye view of the hitch of the trailer, and wherein the vehicular trailering assist system determines the matching score based on determining a respective column score for each of a plurality of columns of the transformed bird's-eye view of the hitch of the trailer;

wherein the vehicular trailering assist system determines that the matching score for one of the at least one stored trailer template is greater than a threshold matching score; and wherein the vehicular trailering assist system, responsive to determining that the matching score for the one of the at least one stored trailer template is greater than the threshold matching score, tracks a trailer angle of the trailer using the one of the at least one stored trailer template.

13. The vehicular trailering assist system of claim 12, wherein the vehicular trailering assist system generates respective matching scores based on comparison between respective stored trailer templates of the plurality of stored trailer templates and the transformed bird's-eye view of the hitch of the trailer, and wherein the matching score for the one of the at least one stored trailer template is the highest matching score.

14. The vehicular trailering assist system of claim 12, wherein each column is associated with a respective trailer angle of the trailer relative to the vehicle.

15. The vehicular trailering assist system of claim 12, wherein the matching score is based on the highest column score of each respective column score.

16. The vehicular trailering assist system of claim 12, wherein the transformed bird's-eye view of the hitch of the trailer is representative of at least a portion of the trailer.

17. A vehicular trailering assist system, the vehicular trailering assist system comprising:

a camera disposed at a vehicle equipped with the vehicular trailering assist system, the camera viewing at least rearward of the vehicle, wherein the camera is operable to capture frames of image data;

wherein the camera comprises a CMOS imaging array, and wherein the CMOS imaging array comprises at least one million photosensors arranged in rows and columns;

an electronic control unit (ECU) comprising electronic circuitry and associated software;

wherein image data captured by the camera is transferred to and are processed at the ECU;

wherein the vehicular trailering assist system, with a trailer hitched to the vehicle and with the camera viewing at least a hitch of the trailer that hitches the trailer to the vehicle, and via processing at the ECU of image data captured by the camera and transferred to the ECU, transforms image data captured by the camera into a transformed bird's-eye view of the hitch of the trailer;

wherein the vehicular trailering assist system accesses a plurality of stored trailer templates, and wherein each respective stored trailer template of the plurality of stored trailer templates was generated during a previous calibration of the system for a respective trailer associated with the respective stored trailer template;

wherein the vehicular trailering assist system generates respective matching scores based on comparison between respective stored trailer templates of the plurality of stored trailer templates and the transformed bird's-eye view of the hitch of the trailer, and wherein the vehicular trailering assist system generates the respective matching scores by applying a dilation to the respective stored trailer template and removing edges from the transformed bird's-eye view of the hitch of the trailer;

wherein the vehicular trailering assist system determines a highest matching score from the respective matching scores;

wherein the vehicular trailering assist system determines that the highest matching score is greater than a threshold matching score; and wherein the vehicular trailering assist system, responsive to determining that the highest matching score is greater than the threshold matching score, tracks a trailer angle of the trailer using the respective stored trailer template with the highest matching score.

18. The vehicular trailering assist system of claim 17, wherein the vehicular trailering assist system removes edges from the transformed bird's-eye view of the hitch of the trailer based on a dot product between the respective stored trailer template and the transformed bird's-eye view of the hitch of the trailer.

19. The vehicular trailering assist system of claim 17, wherein the vehicular trailering assist system removes edges using a connected component algorithm.

20. The vehicular trailering assist system of claim 17, wherein a number of edges removed is based on a total number of edges in the transformed bird's-eye view of the hitch of the trailer.

* * * * *